(12) United States Patent
Sun et al.

(10) Patent No.: US 12,505,664 B2
(45) Date of Patent: Dec. 23, 2025

(54) INTERACTIVE USER FEEDBACK SYSTEM TO ENHANCE INSPECTION ACCURACY OF AUTOMATED VISUAL INSPECTION SYSTEM

(71) Applicants: Kapito Inc., Hsinchu (TW); Feng-Tso Sun, Hsinchu (TW); Yi-Ting Yeh, Hsinchu (TW); Feng-Yu Sun, Hsinchu (TW)

(72) Inventors: Feng-Tso Sun, Hsinchu (TW); Yi-Ting Yeh, Hsinchu (TW); Feng-Yu Sun, Hsinchu (TW); Jyun-Tang Huang, Hsinchu (TW); Rong-Hua Chang, Hsinchu County (TW); Meng-Tse Shen, Hsinchu (TW)

(73) Assignees: KAPITO INC., Hsinchu (TW); Feng-Tso Sun, Hsinchu (TW); Yi-Ting Yeh, Hsinchu (TW); Feng-Yu Sun, Hsinchu (TW)

( * ) Notice: Subject to any disclaimer, the term of this patent is extended or adjusted under 35 U.S.C. 154(b) by 59 days.

(21) Appl. No.: 18/583,862

(22) Filed: Feb. 22, 2024

(65) Prior Publication Data
US 2024/0282096 A1  Aug. 22, 2024

(30) Foreign Application Priority Data
Feb. 22, 2023  (TW) .................................. 112106427

(51) Int. Cl.
*G06V 10/94* (2022.01)
*G06T 7/00* (2017.01)
(Continued)

(52) U.S. Cl.
CPC ............ *G06V 10/945* (2022.01); *G06T 7/001* (2013.01); *G06V 10/443* (2022.01);
(Continued)

(58) Field of Classification Search
CPC .. G06V 10/945; G06V 10/443; G06V 10/751; G06V 10/764; G06V 10/7788;
(Continued)

(56) References Cited

U.S. PATENT DOCUMENTS 6,266,138 B1 * 7/2001 Keshavmurthy ...... G01N 21/88
356/600
8,581,162 B2 * 11/2013 Campbell .............. G01B 11/24
382/141
(Continued)

FOREIGN PATENT DOCUMENTS

| CN | 111060514 A | 4/2020 |
|---|---|---|
| TW | 202130991 A | 8/2021 |

(Continued)

*Primary Examiner* — Marnie A Matt
(74) *Attorney, Agent, or Firm* — ANOVA LAW GROUP, PLLC

(57) ABSTRACT

An interactive user feedback system for enhancing the inspection accuracy of an automated visual inspection (AVI) system is disclosed. When working normally, the AVI system acquires an article image from a continuous article transferred by a transfer equipment, and then determines whether there is at least one defect feature existing in the article image or not. Subsequently, the interactive user feedback system enables a display of the electronic device show an inspection report region consisting of M×N sub-regions. As such, the display is enabled to show a zoom-in sub-image containing at least one defect after a sub-region is clicked. Therefore, by viewing the zoom-in sub-image, an inspector can determine whether a defect classification data made by the AVI system is correct or not. If not, the inspector is able to revise the defect classification data through the interactive user feedback system.

9 Claims, 5 Drawing Sheets

(51) Int. Cl.
*G06V 10/44* (2022.01)
*G06V 10/75* (2022.01)
*G06V 10/764* (2022.01)
*G06V 10/778* (2022.01)
*H04N 7/18* (2006.01)

(52) U.S. Cl.
CPC .......... *G06V 10/751* (2022.01); *G06V 10/764* (2022.01); *G06V 10/7788* (2022.01); *H04N 7/181* (2013.01); *G06T 2200/24* (2013.01); *G06T 2207/20081* (2013.01); *G06T 2207/20092* (2013.01); *G06T 2207/30108* (2013.01)

(58) Field of Classification Search
CPC ................. G06T 7/001; G06T 2200/24; G06T 2207/20081; G06T 2207/20092; G06T 2207/30108; G06T 7/0004; H04N 7/181
USPC ........................................................ 348/129
See application file for complete search history.

(56) References Cited

U.S. PATENT DOCUMENTS

| | | | |
|---|---|---|---|
| 10,502,695 | B2* | 12/2019 | Safai ..................... G01N 21/94 |
| 11,150,200 | B1* | 10/2021 | Watson ................ G01N 21/956 |
| 2019/0056334 | A1* | 2/2019 | Safai ..................... H04N 23/56 |
| 2019/0228519 | A1* | 7/2019 | Guo ......................... G06T 7/001 |
| 2021/0208126 | A1* | 7/2021 | Lee ......................... G06T 7/0004 |
| 2021/0209739 | A1* | 7/2021 | Wen ..................... H01M 10/4285 |
| 2021/0390681 | A1* | 12/2021 | Watson .................. G06T 7/001 |
| 2023/0061439 | A1* | 3/2023 | Sun ......................... G06T 7/001 |
| 2023/0360196 | A1* | 11/2023 | Martins Loureiro ....................... G06T 7/0004 |
| 2024/0160194 | A1* | 5/2024 | Bakhshmand .......... G06N 20/10 |

FOREIGN PATENT DOCUMENTS

| | | |
|---|---|---|
| TW | I767828 B | 6/2022 |
| WO | 2022029675 A1 | 2/2022 |

* cited by examiner

INTERACTIVE USER FEEDBACK SYSTEM TO ENHANCE INSPECTION ACCURACY OF AUTOMATED VISUAL INSPECTION SYSTEM

CROSS-REFERENCE TO RELATED APPLICATION

This application claims the priority of Taiwan Patent Application No. 112106427, filed on Feb. 22, 2023, the content of which is incorporated by reference in its entirety.

BACKGROUND OF THE INVENTION

Technical Field

The present invention relates to the technology field of machine vision, and more particularly to an interactive user feedback system to enhance inspection accuracy of automated visual inspection system.

Background

It is well known that applying a defect inspection to a woven article like cloth is necessary before the woven article is ready to be packed. Currently, the defect inspection is conducted by an inspector through operating a fabric inspection machine (also called perching machine), and the perching machine conventionally consists of an unwinding mechanism, a fabric spreading mechanism and a winding mechanism. When conducting the defect inspection, the inspector stands near an operation platform, and then controls a moving speed of the woven article (called "fabric" hereinafter) by operating a controller, thereby making a specific length of the fabric be stopped on an inspection platform. Therefore, the inspector is able to detailedly inspect and verify at least one defect existing on the specific segment. If the defect(s) is repairable, the defect can be repaired by the inspector; otherwise, the defect(s) is labeled by the inspector.

The experienced inspectors have found the conventional perching machine exhibits a primary drawback when being applied in conducting the defect inspection. The primary drawback is that, since the inspector uses his eyes to inspect and verify at least one defect from a specific segment stopped on the inspection platform, at least one defect not found by the inspector does hard avoid to take place. Accordingly, Taiwan Patent No. I767828 discloses a defect inspection system (or called automatic vision inspection (AVI) system) with motor controlling function. The AVI system with motor controlling function is allowed to be integrated in a perching machine, and mainly comprises a line light source, at least one camera and an electronic device including processor and memory. When the AVI system and the perching machine work normally, a detect light emitted by the line light source is directed to a photographing region of the camera, and the camera is controlled to acquire a fabric image from a specific segment of the fabric that is transferred to be moved into the photographing region. Subsequently, the processor accesses the memory so as to execute a defect inspection program, thereby applying an AI defect inspection to the fabric image. If the fabric image is inspected to exist at least one defect(s) therein, the electronic device makes the specific segment of the fabric be transferred and then stopped on an inspection platform by controlling the motors of the unwinding mechanism and the winding mechanism. As a result, the inspector repairs the defect(s) if it is repairable; otherwise, the defect(s) is labeled by the inspector.

As described in more detail below, the application program is integrated with a pre-trained defect inspection model, such that the processor is configured to apply the AI defect inspection to the fabric image while executing the pre-trained defect inspection model by accesses the memory. Computer science (CS) engineer skilled in the development of AI image processing model certainly know that, the defect inspection model is produced after applying a machine learning process to an image classifier (or called image classification model) under using a training dataset, in which the training dataset including golden samples and defect samples of the fabric, and the defect samples are all labeled according to the defect types thereof; for example, clip mark, bow, burl mark, coarse end, and coarse pick. Therefore, after a fabric image is imported to the defect inspection model, the defect inspection model firstly extracts a feature pattern from the fabric image, and then applies a feature matching process to the feature pattern and at least one defect feature pattern extracted from at least one labeled defect sample. As a result, the defect inspection model determines whether the fabric image contains at least one defect feature as well as classifies the type of the defect(s) existing in the segment of the fabric under inspection.

However, according to the inspector's real operation experience, the foregoing AVI system is unable to inspect and classify all defects from a fabric with 100% accuracy. As explained in more detail below, FIG. 1 illustrates a Venn diagram for describing an intersection between region A and region B, in which region A covers statistical data of fabric defects that are not found by the AVI system but picked up by inspectors, and region B enclosures statistical data of fabric defects that are not found by inspectors but picked up by the AVI system. Therefore, it is understood that region C is an intersection region of region A and region B, and region C enclosures statistical data of fabric defects that are both picked up by inspectors and the AVI system. Moreover, it is also understood that the AVI system fails to inspect and classify all defects from a fabric with 100% accuracy. The reason is that there are a plenty of fabric defect types, such that the defect inspection model of the AVI system fails to pick up each type of fabric defects if it is not well trained by adequate defect samples, and may classify a A-type fabric defect to be a B-type fabric defect.

For above reasons, to develop a user feedback system is worth being considered. After installing the user feedback system in an electronic device like a tablet computer, the AVI system is able to transmit all fabric images containing different defect features to the electronic device, such that the inspector can double check each of the fabric images by operating the electronic device, thereby determining whether the fabric defect classification data produced by the AVI system include incorrect data or not.

Accordingly, inventors of the present application have made great efforts to make inventive research and eventually provided an interactive user feedback system for use in increasing inspection accuracy of automated visual inspection system.

SUMMARY

The primary objective of the present invention is to provide an interactive user feedback system, which is implemented in an electronic device for enhancing the inspection accuracy of an automated visual inspection (AVI) system. When working normally, the AVI system acquires an article image from a continuous article transferred by a transfer equipment, and then determines whether there is at least one defect feature existing in the article image or not. Subsequently, the interactive user feedback system enables a display of the electronic device to show an inspection report region consisting of M×N sub-regions. As such, the display is enabled to show a zoom-in sub-image containing at least one defect after a sub-region is clicked. Therefore, by viewing the zoom-in sub-image, an inspector can determine whether a defect classification data made by the AVI system is correct or not. If not, the inspector is able to revise the defect classification data through the interactive user feedback system.

For achieving the primary objective mentioned above, the present invention provides an embodiment of the interactive user feedback system, which is implemented into an automated visual inspection (AVI) system that comprises a plurality of cameras and a host electronic device. In case of a test segment of a continuous article being moved to fall in a photographing region, the plurality of cameras are controlled by the host electronic device so as to acquire an article image from the test segment, and the host electronic device subsequently applies a defect inspection process to the article image, thereby picking up K numbers of defects from the article image. K is a positive integer, and said interactive user feedback system comprising:

an electronic device, being coupled to the host electronic device, and comprising a first processor, a first memory coupled to the first processor and a first display coupled to the first processor, wherein the first memory stores a first application program, and the first processor executing the first application program so as to be configured to:

receive, from the host electronic device, an information of the photographing region comprising a region length and a region width;

generate, based on the region length and the region width, a data displaying region consisting of M×N numbers of sub-regions; wherein M and N are both positive integer;

display, by controlling the first display, M×N numbers of defect inspection data of the article image in the M×N numbers of sub-regions, correspondingly; wherein each said defect inspection data comprises a sub-image of the article image and at least one defect classification item;

show, by controlling the first display, corresponding said sub-image after one said sub-region is clicked;

replace, after a specific defect classification item is selected from the defect classification item menu, said defect classification item of one said defect inspection data with the specific defect classification item; and store, the M×N numbers of defect inspection data and the article image in the first memory.

In one embodiment, the electronic device is selected from a group consisting of smart phone, tablet computer, desktop computer, laptop computer, and all-in-one computer.

In one embodiment, the continuous article is selected from a group consisting of fabric, thin metal sheet, metal foil, flexible PCB, flexible touch panel, OLED panel, and flexible solar panel.

In one practicable embodiment, the first processor executes the first application program so as to be further configured to:

transmit, the article image and a defect inspection report of the article image to a remote electronic device; wherein the defect inspection report comprises the M×N numbers of defect inspection data;

update, based on the article image and the M×N numbers of defect inspection data, a dataset comprising a plurality of golden samples and a plurality of defect samples; and re-train, by utilizing the dataset, a defect inspection model for installing in the AVI system.

In another one practicable embodiment, the first processor executes the first application program so as to be further configured to:

transmit, the article image and a defect inspection report of the article image to a remote electronic device; wherein the defect inspection report comprises the M×N numbers of defect inspection data;

update, based on the article image and the M×N numbers of defect inspection data, a dataset comprising a plurality of golden samples and a plurality of defect samples; and train, by utilizing the dataset, a defect inspection model for installing in the AVI system.

In one embodiment, the said sub-region has a region coordinate consists of a length value and a width value.

In one embodiment, the AVI system is connected to an article transferring equipment, and the article transferring equipment comprises a roll-to-roll device comprising an unwinding module, a winding module and an inspection platform.

In one embodiment, the host electronic device comprises a second processor and a second memory coupled to the second processor, and the second memory stories a second application program and a plurality of reference defect feature patterns, such that the second processor executes the second application program so as to be configured to:

move, by controlling the unwinding module and the winding module, the continuous article;

photograph, by controlling the plurality of cameras, the test segment falling in the photographing region during the continuous article being transferring by the article transferring equipment, thereby acquiring the article image from the test segment;

extract, a feature pattern from the article image;

determine, by applying a feature matching process to the feature pattern and at least one reference defect feature pattern, whether the article image contains at least one defect or not;

classify, in case of at least one defect being picked up from the article image, the at least one defect with a specific defect classification item;

move, by controlling the unwinding module and the winding module, the test segment to be stopped on the inspection platform; and re-move, by controlling the unwinding module and the winding module, the continuous article after said interactive user feedback system is operated to accomplish a review of each of the K numbers of defects.

In one embodiment, the article transferring equipment further comprising:

a meter counter, being coupled to the host electronic device, and being configured for counting a moving length of the continuous article;

a first rotation speed sensor, being connected to a first motor of the unwinding module, and being coupled to the host electronic device; and a second rotation speed sensor, being connected to a second motor of the winding module, and being coupled to the host electronic device.

In one embodiment, the host electronic device further comprises a human machine interface (HMI), such that the article transferring equipment is controlled to move the continuous article by operating the human-machine interface.

In one embodiment, each said camera has a photographic coverage, the plurality of cameras have a total photographic coverage, and the total photographic coverage has a first width greater than a second width of the continuous article.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an interactive user feedback system according to the present invention, embodiments of the present invention will be described in detail with reference to the attached drawings hereinafter.

Figure 1:
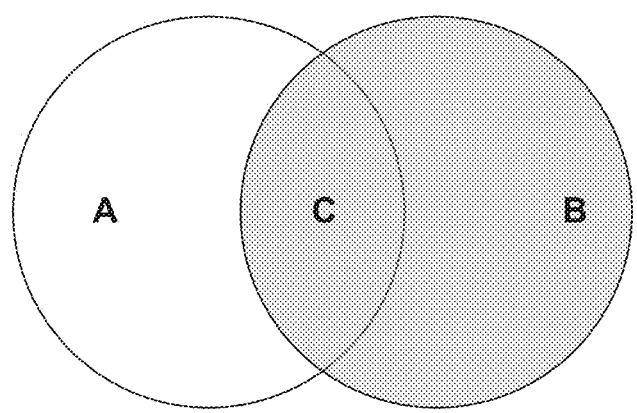
FIG. 1 is a Venn diagram for describing an inspection between A region and B region.
Figure 2:
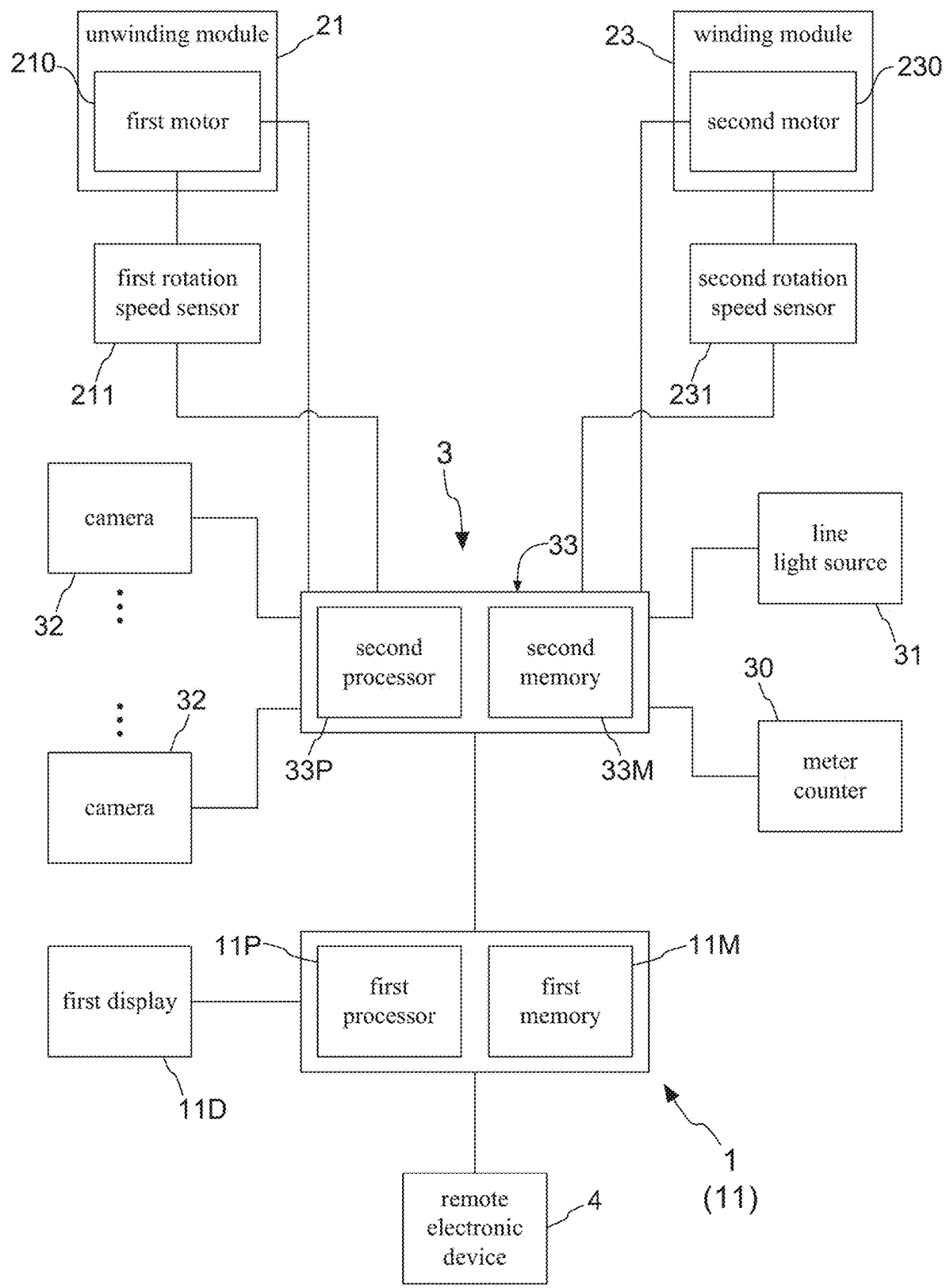
FIG. 2 is a block diagram of an automated visual inspection (AVI) system including an interactive user feedback system according to the present invention.
Figure 3A:
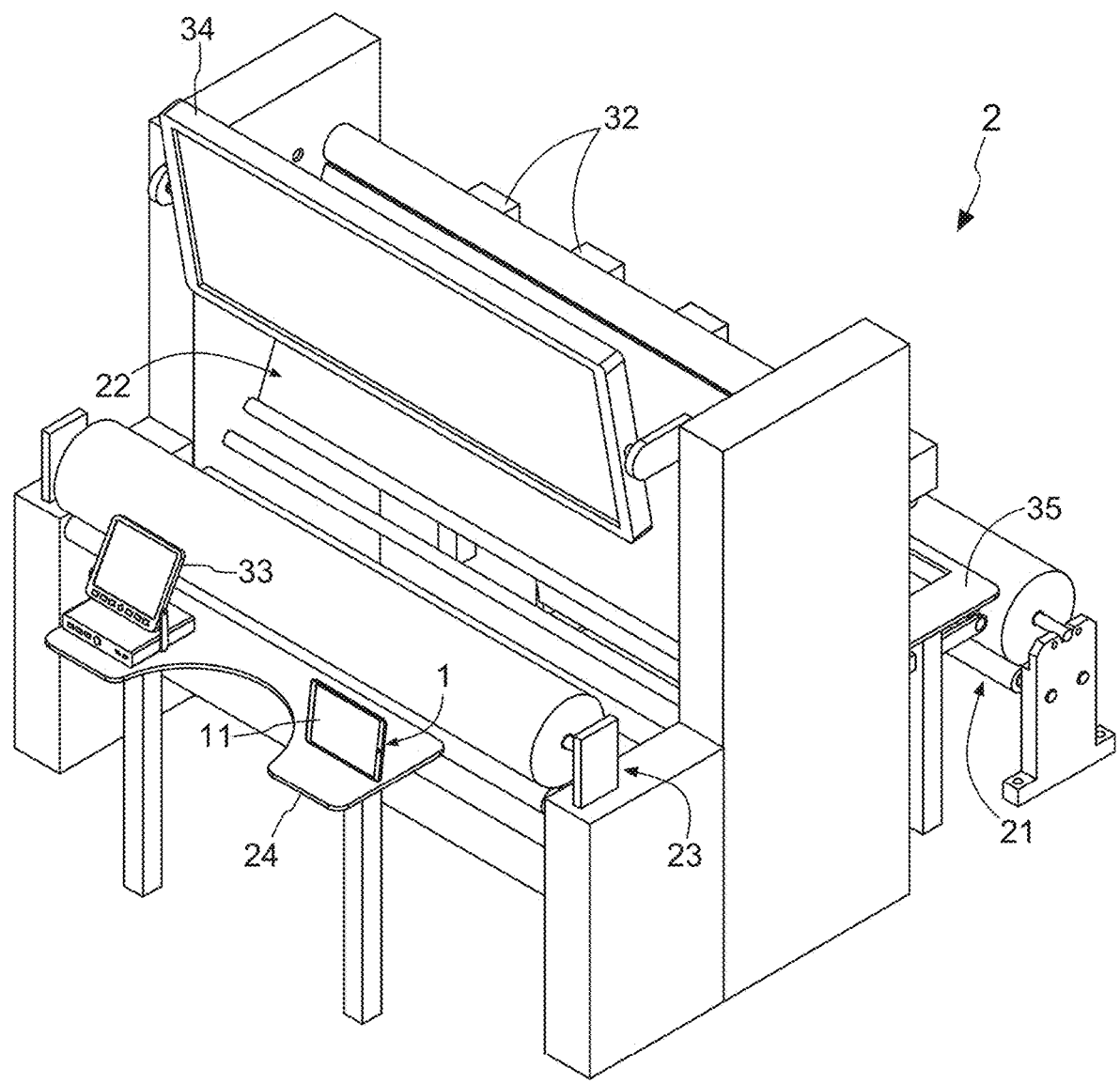
FIG. 3A is a first stereo diagram of an article transferring equipment including the AVI system shown in FIG. 2.
Figure 3B:
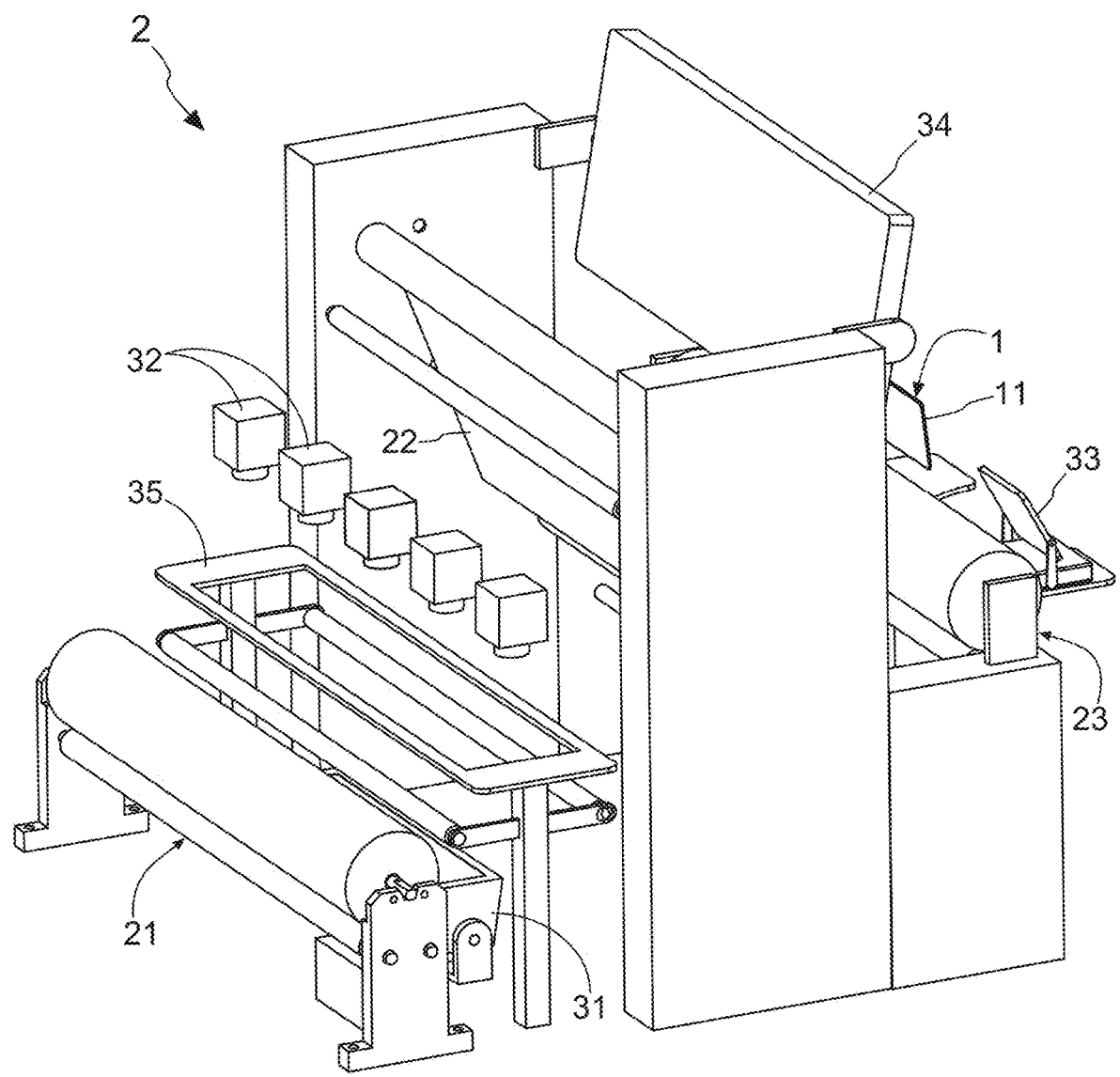
FIG. 3B is a second stereo diagram of the article transferring equipment.

FIG. 2 illustrates a block diagram of an automated visual inspection (AVI) system including an interactive user feedback system according to the present invention. In FIG. 2, the interactive user feedback system 1 is depicted to comprise a first processor 11P, a first memory 11M coupled to the first processor 11P and a first display 11D coupled to the first processor 11P, and is presented by a form of an electronic device so as to be implemented into the AVI system 3. Moreover, according to the present invention, a first application program is stored in the first memory 11M. In addition, FIG. 3A is a first stereo diagram of an article transferring equipment 2 including the AVI system 3, and FIG. 3B depicts a second stereo diagram of the article transferring equipment 2. According to FIG. 2, FIG. 3A and FIG. 3B, the AVI system 3 comprises a line light source 31, a plurality of cameras 32 and a host electronic device 33, wherein each said camera 32 has a photographic coverage, and the plurality of cameras 32 have a total photographic coverage having a first width greater than a second width of a continuous article. Therefore, when the AVI system 3 and the article transferring equipment 2 work normally, the continuous article is transferred by the article transferring equipment 2, such that a test segment of the continuous article is moved to fall in a photographing region (i.e., the total photographic coverage of the cameras 32). In the meantime, the plurality of cameras 32 are controlled by the host electronic device 33 so as to acquire an article image from the test segment, and the host electronic device 33 subsequently applies a defect inspection process to the article image, thereby picking up at least one defect from the article image.

It is noted that, since FIG. 3A and FIG. 3B depict that the article transferring equipment 2 is a perching machine, the aforesaid continuous article is correspondingly a fabric. However, in any one of practicable embodiments the article transferring equipment 2 is not limited to be a perching machine, and the continuous article can be, but is not limited to, fabric, thin metal sheet, metal foil, flexible PCB, flexible touch panel, OLED panel, or flexible solar panel. It is worth mentioning that the only limit for the article transferring equipment 2 is needing to include a roll-to-roll device.

According to the FIG. 2, FIG. 3A and FIG. 3B, the roll-to-roll device of the article transferring equipment 2 comprises an unwinding module 21 and a winding module 23, and the article transferring equipment 2 further comprises an inspection platform 22. On the other hand, the host electronic device 33 comprises a second processor 33P and a second memory 33M, in which the second memory 33M stores a second application program and a plurality of reference defect feature patterns, such that the second processor 33P executes the second application program so as to be configured to:

move the continuous article by controlling the unwinding module 21 and the winding module 23;
photograph a test segment of the continuous article that falls in the photographing region by controlling the plurality of cameras 32, thereby acquiring an article image from the test segment;
extract a feature pattern from the article image;
determine whether there is at least one defect existing in the article image by applying a feature matching process to the feature pattern and at least one reference defect feature pattern;
picking up K numbers of defects from the article image, wherein K is a positive integer; and
classify the K numbers of defects with at least one defect classification item.

Moreover, the second processor 33P executing the second application program would be further configured to:

move the test segment to be stopped on the inspection platform 22 by controlling the unwinding module 21 and the winding module 23 in case of at least one defect being picked up; and
re-move the continuous article by controlling the unwinding module 21 and the winding module 23 continuous article after said interactive user feedback system 1 is operated by an inspector to accomplish a review of each of the K numbers of defects.

It is worth further explaining that, the article transferring equipment 2 further comprises a meter counter 30, a first rotation speed sensor 211 and a second rotation speed sensor 231, in which the first rotation speed sensor 211 is connected to a first motor 210 of the unwinding module 21, and is also coupled to the host electronic device 33. Moreover, the second rotation speed sensor 231 is connected to a second motor 230 of the winding module 23, and is also coupled to the host electronic device 33. On the other hand, the meter counter 30 is coupled to the host electronic device 33, and is configured for counting a moving length of the continuous article.

In one embodiment, the interactive user feedback system 1 is presented by a form of an electronic device coupled to the host electronic device 33, and the electronic device can be, but is not limited to, smart phone, tablet computer, desktop computer, laptop computer, or all-in-one computer. According to the present invention, the first memory 11M of the electronic device store a first application program, such that the first processor 11P is configured to controls the first display 11D to show a user interface (UI) after executing the first application program by accessing the first memory 11M. Moreover, after executing the first application program, the first processor 11P is configured to:

receive, from the host electronic device 33, an information of the photographing region comprising a region length and a region width;

generate, based on the region length and the region width, a data displaying region consisting of M×N numbers of sub-regions; wherein M and N are both positive integer;

display, by controlling the first display 11D, M×N numbers of defect inspection data of the article image in the M×N numbers of sub-regions, correspondingly; wherein each said defect inspection data comprises a sub-image of the article image and at least one defect classification item;

show, by controlling the first display 11D, corresponding said sub-image after one said sub-region is clicked;

replace, after a specific defect classification item is selected from the defect classification item menu, said defect classification item of one said defect inspection data with the specific defect classification item; and store, the M×N numbers of defect inspection data and the article image in the first memory 11M.

Figure 4:
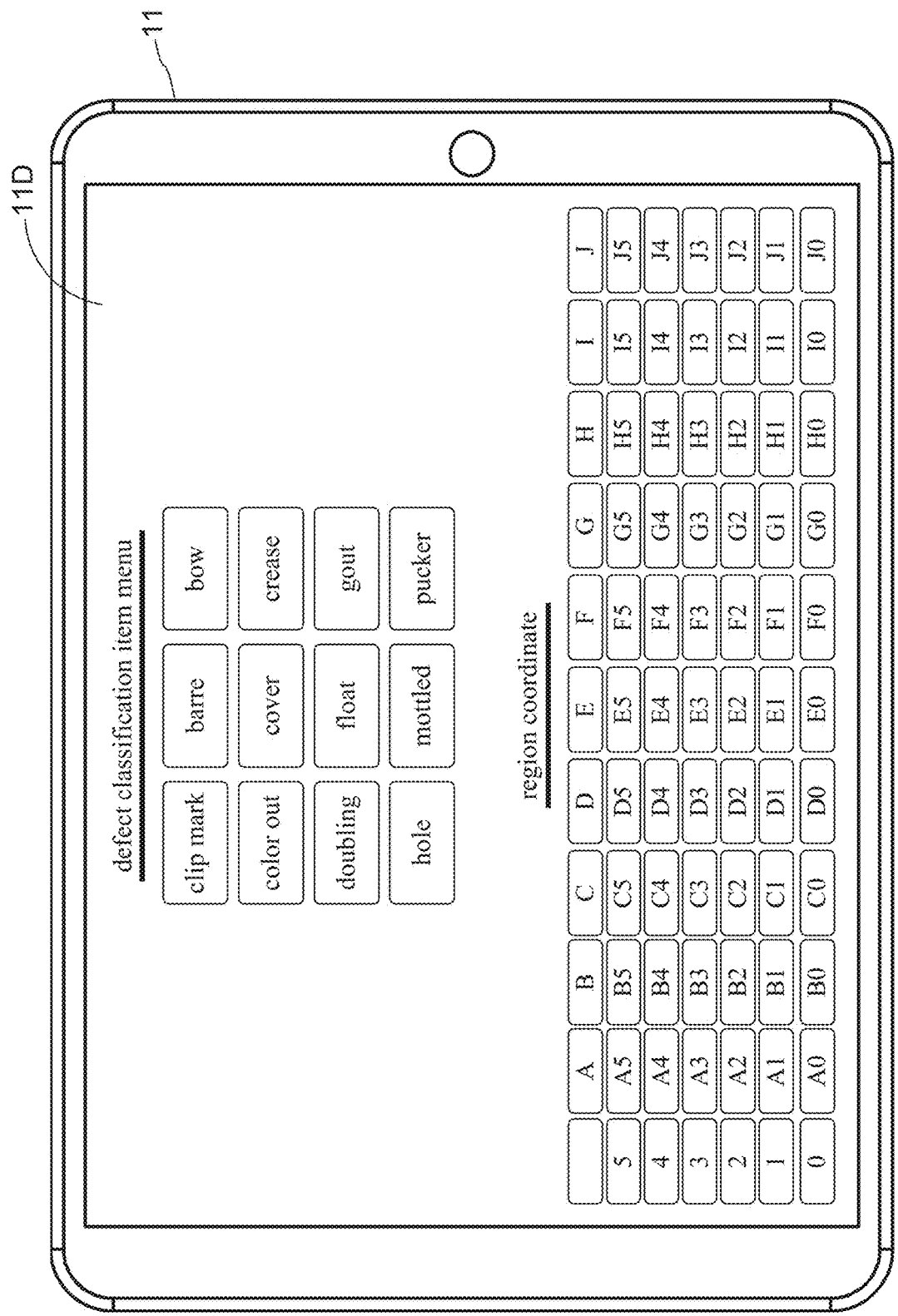
FIG. 4 is a top view of the interactive user feedback system according to the present invention.

FIG. 4 is a top view of the interactive user feedback system according to the present invention. In FIG. 4 the interactive user feedback system 1 is a tablet computer, and the first display 11D is controlled to show a user interface (UI) for operation of an inspector. In practical operation, the AVI system 3 would produce a defect inspection report including M×N numbers of defect inspection data, wherein each said defect inspection data comprises a sub-image of the article image and at least one defect classification item. Therefore, after receiving the defect inspection report from the host electronic device 33, the interactive user feedback system 1 displays the M×N numbers of defect inspection data of the article image in the M× N numbers of sub-regions, correspondingly. According to FIG. 4, it is understood that each said sub-region has a region coordinate consists of a length value and a width value; for example, length value is 5 and width value is A.

By operating the UI shown as FIG. 4, one said sub-region like A5 may be clicked by the inspector, and then the first display 11D is controlled to show a corresponding sub-image and at least one defect classification item. In such case, the inspector is able to determine whether at least one defect classification item is correct or not. If the defect classification item is incorrect, the operator can select one specific defect classification from the defect classification item menu, and then replace said incorrect defect classification item with the specific defect classification item by operating the UI. In addition, if the AVI system 3 judges there is at least one defect existing in one said sub-image but the inspect judges no defect existing in aforesaid sub-image, the operator can also operate the UI to clear the defect classification item of the sub-image. Eventually, after the sub-images with their defect classification items are all reviewed by the inspector, the defect inspection report including the M×N numbers of defect inspection data is stored in the first memory 11M. In the meantime, the inspector is able to operate a control box that is coupled to the host electronic device 33 to control the article transferring equipment 2, thereby making the continuous article be continuously moved by the unwinding module 21 and the winding module 23.

In addition, after executing the first application program, the first processor 11P can be further configured to:

transmit, the article image and a defect inspection report of the article image to a remote electronic device 4; wherein the defect inspection report comprises the M×N numbers of defect inspection data;

update, based on the article image and the M×N numbers of defect inspection data, a dataset comprising a plurality of golden samples and a plurality of defect samples; and re-train, by utilizing the dataset, a defect inspection model for installing in the AVI system 3.

It should be understood that, by utilizing the AVI system 3 and the interactive user feedback system 1 according to the present invention, a new dataset can be produced, such that the new dataset can be further utilized in training a new defect inspection model for installing in the AVI system 3. Therefore, the AVI system 3 can be operated to apply a defect inspection process to a new article.

In conclusion, the present invention discloses an interactive user feedback system for enhancing the inspection accuracy of an automated visual inspection (AVI) system. When working normally, the AVI system acquires an article image from a continuous article transferred by an article transferring equipment, and then determines whether there is at least one defect feature existing in the article image or not. Subsequently, the interactive user feedback system enables a display of an electronic device show an inspection report region consisting of M×N sub-regions. As such, the display is enabled to show a zoom-in sub-image containing at least one defect after a sub-region is clicked. Therefore, by viewing the zoom-in sub-image, an inspector can determine whether a defect classification data made by the AVI system is correct or not. If not, the inspector is able to revise the defect classification data through the interactive user feedback system.

Therefore, through above descriptions, all embodiments and their constituting elements of the interactive user feedback system according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. An interactive user feedback system, being implemented into an automated visual inspection (AVI) system that comprises a plurality of cameras and a host electronic device; wherein in case of a test segment of a continuous article being moved to fall in a photographing region, the plurality of cameras being controlled by the host electronic device so as to acquire an article image from the test segment, and the host electronic device subsequently applying a defect inspection process to the article image, thereby picking up K numbers of defects from the article image; wherein K is a positive integer, and said interactive user feedback system comprising:

an electronic device, being coupled to the host electronic device, and comprising a first processor, a first memory coupled to the first processor and a first display coupled to the first processor, wherein the first memory stores a first application program, and the first processor executing the first application program so as to be configured to:

receive, from the host electronic device, an information of the photographing region comprising a region length and a region width;

generate, based on the region length and the region width, a data displaying region consisting of M×N numbers of sub-regions; wherein M and N are both positive integers;

display, by controlling the first display, M×N numbers of defect inspection data of the article image in the M×N numbers of sub-regions, correspondingly; wherein each said defect inspection data comprises a sub-image of the article image and at least one defect classification item;

show, by controlling the first display, corresponding said sub-image after one said sub-region is clicked;

replace, after a specific defect classification item is selected from the defect classification item menu, said defect classification item of one said defect inspection data with the specific defect classification item;

store, the M×N numbers of defect inspection data and the article image in the first memory;

transmit, the article image and a defect inspection report of the article image to a remote electronic device; wherein the defect inspection report comprises the M×N numbers of defect inspection data;

update, based on the article image and the M×N numbers of defect inspection data, a dataset comprising a plurality of golden samples and a plurality of defect samples; and re-train, by utilizing the dataset, a defect inspection model for installing in the AVI system.

2. The interactive user feedback system of claim 1, wherein the electronic device is selected from a group consisting of smart phone, tablet computer, desktop computer, laptop computer, and all-in-one computer.

3. The interactive user feedback system of claim 1, wherein the continuous article is selected from a group consisting of fabric, thin metal sheet, metal foil, flexible PCB, flexible touch panel, OLED panel, and flexible solar panel.

4. The interactive user feedback system of claim 1, wherein said sub-region has a region coordinate consists of a length value and a width value.

5. The interactive user feedback system of claim 1, wherein the AVI system is connected to an article transferring equipment, and the article transferring equipment comprising a roll-to-roll device comprising an unwinding module, a winding module and an inspection platform.

6. The interactive user feedback system of claim 5, wherein the host electronic device comprises a second processor and a second memory coupled to the second processor, and the second memory storing a second application program and a plurality of reference defect feature patterns, such that the second processor executes the second application program so as to be configured to:

move, by controlling the unwinding module and the winding module, the continuous article;

photograph, by controlling the plurality of cameras, the test segment falling in the photographing region during the continuous article being transferring by the article transferring equipment, thereby acquiring the article image from the test segment;

extract, a feature pattern from the article image;

determine, by applying a feature matching process to the feature pattern and at least one reference defect feature pattern, whether the article image contains at least one defect or not;

classify, in case of at least one defect being picked up from the article image, the at least one defect with a specific defect classification item;

move, by controlling the unwinding module and the winding module, the test segment to be stopped on the inspection platform; and re-move, by controlling the unwinding module and the winding module, the continuous article after said interactive user feedback system is operated to accomplish a review of each of the K numbers of defects.

7. The interactive user feedback system of claim 6, wherein the article transferring equipment further comprising:

a meter counter, being coupled to the host electronic device, and being configured for counting a moving length of the continuous article;

a first rotation speed sensor, being connected to a first motor of the unwinding module, and being coupled to the host electronic device; and a second rotation speed sensor, being connected to a second motor of the winding module, and being coupled to the host electronic device.

8. The interactive user feedback system of claim 7, wherein the host electronic device further comprises a human machine interface (HMI), such that the article transferring equipment is controlled to move the continuous article by operating the human-machine interface.

9. The interactive user feedback system of claim 7, wherein each said camera has a photographic coverage, the plurality of cameras having a total photographic coverage, and the total photographic coverage having a first width greater than a second width of the continuous article.

* * * * *